March 24, 1959     J. P. LAMB     2,879,468
EARTH BOREHOLE INVESTIGATION SYSTEM
Filed Feb. 8, 1954
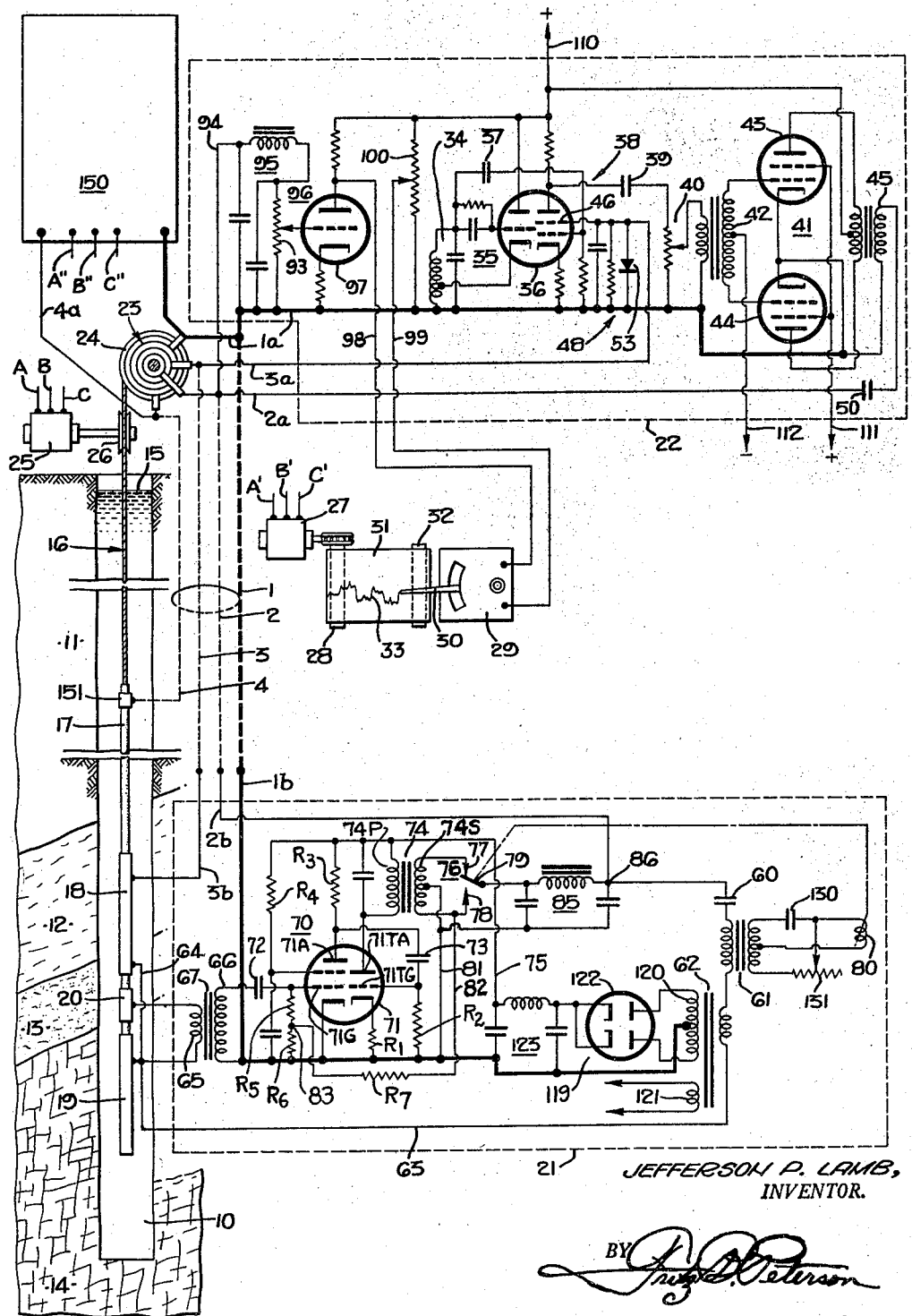
JEFFERSON P. LAMB,
INVENTOR.
BY 
AGENT

United States Patent Office 2,879,468
Patented Mar. 24, 1959

2,879,468

EARTH BOREHOLE INVESTIGATION SYSTEM

Jefferson P. Lamb, Monterey Park, Calif., assignor, by mesne assignments, to Dresser Industries, Inc., Dallas, Tex., a corporation of Delaware Application February 8, 1954, Serial No. 408,714

15 Claims. (Cl. 324—1)

This invention relates in general to a system for conducting investigations relative to the nature or characteristics of earth formations penetrated by an earth borehole, and more particularly to an electrical system for that purpose wherein one or more electrical characteristics of the earth formations are investigated by means including an electrode system of one or more electrodes which is moved through the borehole by a suspending or supporting means in the form of an insulated electrical conductor or a cable comprising a plurality of such conductors, the conductor or conductors serving to convey the necessary electric current to the electrode system in the borehole and to act as a transmission means for conveying back out of the borehole one or more signals representing the information obtained by the means including the electrode system. Certain aspects of the invention relate to the entire broad class of investigating systems of the type aforementioned, while other aspects relate to a more limited class of such systems in which a particular type of electrode system and a particular type of electrode system suspending means are employed; and one further aspect of the invention relates to a specific type of investigative system commonly known in the art as a "guarded-electrode" borehole logging system.

For purposes of illustrating and explaining all aspects of the system comprehended in the invention, the system is hereinafter described and shown as it would be incorporated in an electrical borehole logging system of the aforementioned "guarded electrode" type; but as hereinabove indicated and as is hereinafter made apparent, certain features of the invention are not limited to that specific type of investigative system.

As generally practiced heretofore, electrical borehole logging consisted essentially of passing an electric current through a circuit including a cable conductor extending from the surface of the earth to a current input electrode within the borehole and thence through the earth surrounding the electrode and borehole to a remote ground connection, thereby establishing an electric field in the earth formation surrounding the borehole adjacent the electrode, and then measuring the resistance of such circuit. An undesirable feature of many of the prior art electrical logging systems of the type mentioned resided in the fact that the measurements of current and/or potential of the current input electrode within the borehole, or of the resistance presented by the circuit comprising the cable conductor and the path of flow of current through the earth to the remote ground connection, where made at the surface of the earth in such a manner as to introduce error into the measurements caused by variations in the electrical characteristics of the cable conductors within the cable extending between the measuring apparatus and the electrode system within the borehole, by current leakages between the conductors of the cable, by "cross-talk" or capacitive and inductive effects, and by other like effects resulting from employment of the usual alternating current in those systems. In other prior art electrical logging systems an effort was made to eliminate or mitigate the objectionable features caused by measuring the electrical quantities at the surface. For example, efforts have been made to employ large cables of great weight and cost in an effort to reduce leakage, capacitance and inductive effects; and in other instances efforts have been made to secure some sort of measure of the electrical characteristic within the borehole and to apply alternating current signal waves to a conductor within the borehole for transmission to a location outside the borehole for analysis or recording. Neither of these types of efforts has been successful in eliminating to a satisfactory extent the aforementioned shortcomings of the commonly practiced systems of electrical borehole logging. The first-mentioned of these types of efforts provided a system having a somewhat lower degree of inaccuracy due to crosstalk and current leakage and like effects, but only at greatly increased cable cost and while still retaining the objectionable inaccuracies caused by the relatively large and nonuniform changes in cable conductor resistance resulting from operation over the wide range of temperature encountered in an earth borehole. The second type of effort mentioned, wherein a measure of the electrical characteristic was performed in the borehole, reduced cable cost but resulted in a system giving inaccurate results because of the many distortions involved in producing and transmitting an alternating current wave signal representing the measures taken.

The present invention provides means, including apparatus located within the borehole, for there making the required measurements of an electrical characteristic, at a point closely adjacent the electrode system, and for linearly forming and transmitting a unidirectional signal accurately proportional to and representing the measurements, to indicating apparatus outside the borehole and in such a manner as to be free from the aforementioned errors and distortions introduced in prior art systems.

In addition to the measurements of resistance or resistivity, the natural potentials of the earth formations adjacent the borehole have customarily been measured simultaneously, usually by employment of a separate electrode and a separate cable conductor devoted to the natural potential measurements. To accomplish this the cable employed in such an electrical logging system combining both resistivity and natural potential measurements has commonly included a relatively large number of insulated conductors. The present invention provides a novel electrical system by means of which a maximum number of earth characteristic measurements may be accurately made in a borehole and accurately indicated at the earth's surface by means utilizing a minimum number of insulated conductors extending into the borehole.

Still another important feature of the present invention relates not only to improved means for securing exceptionally accurate indications or measurements of the resistance characteristics of the earth formations penetrated by a borehole using only a single electrode in the electrode system therein and a ground connection remote from the electrode, but also improvements in the preferred and herein-disclosed system utilizing the advantages and desirable features of a so-called "guarded" or "shaped field" electrode logging system comprising a pair of relatively long, longitudinally spaced-apart auxiliary or field-forming electrodes, and a relatively short principal or "current" electrode positioned between and insulated from the auxiliary electrodes. In such a system current flowing from the auxiliary electrodes into the surrounding earth serves to shape the flow pattern of the current flowing from the principal or current electrode in such a way as to force the latter current to flow in paths extending substantially radially outward and perpendicular to the borehole axis instead of outward in all directions from the current electrode as a center, as is the case when only a single current electrode is employed. The system of the present invention makes it possible to perform the so-called guarded-electrode method of logging while employing only a single insulated conductor as a conductor cable, or not more than two insulated conductors of the conductor cable if exceptionally accurate results are required; thus making it possible to carry on such exceptionally accurate electrical logging simultaneously with natural potential logging or the logging of other quantities of interest within the borehole by means of a conductor cable containing not more than three insulated conductors. It is well known that a so-called three-conductor cable which comprises but three insulated conductors within an armored or metallic protecting sheath is structurally stronger and more uniformly flexible, lighter, less expensive to manufacture, and possesses longer service life and better electrical characteristics than other multi-conductor cables containing a greater number of conductors. The present invention makes it possible to use and take advantage of these desirable characteristics of a three-conductor cable for conducting the type of investigative or logging operations herein described.

As indicated by the considerations hereinabove mentioned, it is an object of the present invention to provide an improved system for investigating an electrical characteristic of earth formations penetrated by an earth borehole.

Another important object of the invention is to provide an electrical logging system capable of producing very accurate indications at the earth's surface of electrical phenomena in and adjacent a section of an earth borehole.

It is another object of the present invention to provide a system for conducting electrical earth borehole logging which is particularly suited to the use of a three-conductor cable.

Another object of the invention is to provide an efficient, simple and accurate earth borehole logging system.

It is another object of the present invention to provide an improved electrical logging system in which a maximum number of logging measurements can be made using a minimum number of conductors in the conductor cable.

These and other objects and features of novelty of the present invention will become evident hereinafter in the ensuing description and claims considered in conjunction with the drawing in which is illustrated a preferred form of apparatus incorporating and illustrating the aforementioned several aspects of the invention, and in which drawing the figure is a combined vertical sectional view of a typical earth borehole and an elevational view of the general arrangement of the electrode assembly of the apparatus as it appears when suspended within the borehole in readiness for operation; together with circuit diagrams of the electrical apparatus located in part at the earth's surface and in part within the borehole.

Referring to the drawing, it will be noted that there is employed in the illustrated embodiment of the system of the invention a cable of the three-conductor type having an electrically conductive armor sheath which in operation is in electrical contact with the drilling fluid in the borehole, and therefore may conveniently be employed as the aforementioned remote ground connection. It is here pointed out, however, that in certain aspects of the invention only one insulated conductor, such as a single insulated wire, is required; and that the remote ground connection may be provided by a conventional ground rod at the earth's surface. In the drawing, reference numeral 10 indicates an earth borehole drilled by any of the means well known in the art through one or more strata or earth formations such as, for example, formations indicated at 11, 12, 13 and 14. Borehole 10 is filled to a substantial extent, or completely, by a body of liquid 15 which is usually drilling fluid, into which is lowered for traverse through the borehole, equipment depending from a conductor cable 16.

The equipment depending from cable 16 may be variously constructed, but preferably includes an elongated, electrical-insulation-covered support or container 17 suitably secured at its upper end to the cable 16 and having mounted on its exterior at a considerable distance from its upper end, an electrode system comprising a pair of spaced-apart relatively long and preferably coaxially positioned field-shaping auxiliary electrodes 18 and 19 which may be metallic sleeves carried on and insulated from said support 17, and a relatively short current electrode 20 positioned substantially coaxially between the adjacent ends of the long auxiliary electrodes but spaced and insulated from both the support and the auxiliary electrodes. The support 17 is also constructed to contain within its interior, sub-surface apparatus which is indicated diagrammatically within dashed line rectangle 21 at the lower part of the drawing. Conductor cable 16, which may be of a form well known in the art, comprises a metallic sheath and three insulated conductors within the sheath, indicated diagrammatically by respective dashed lines 1, 2, 3 and 4 interconnecting the sub-surface equipment at 21 with the surface equipment which is indicated diagrammatically within the dashed line rectangle 22 located above the surface of the earth. It will be understood that while conductor cable 16 is indicated as comprising a sheath conductor 1 and insulated conductors 2, 3 and 4, it need include but two insulated conductors if natural potential logging is not to be performed, and if precise results are not warranted, only the sheath and one conductor; or only a single insulated conductor if the earth is used as a ground return path for the current. The necessary connections and apparatus for such natural potential logging are diagrammatically illustrated in the drawing, but other than as noted are not related to the present invention.

The equipment positioned at the surface of the earth comprises apparatus principally electrical in nature illustrated diagrammatically and indicated as before-mentioned within dashed line enclosure 22 and which apparatus is connected electrically as indicated to the insulated conductors of the conductor cable. Specifically, conductors 1a, 2a and 3a of the surface apparatus at 22 are connected electrically to respective insulated conductors 1, 2 and 3 of the conductor cable 16 by respective brush and slip ring combinations of a conventional brush and slip ring device 23 mounted on a cable hoist drum 24, as diagrammatically indicated. Also located at the surface is a selsyn generator 25 driven by a drive pulley wheel 26 arranged in driving engagement with the cable 16 and having its leads A, B and C electrically connected to respective leads A', B' and C' of a selsyn motor 27 which is mechanically coupled by gearing to an indicator drum 28 to drive the latter proportionately to movement of the cable 16 in conventional manner, the selsyn motor and generator being energized with suitable A.-C. power from a common source (not shown). For clarity of illustration, the interconnections of the selsyn generator and motor system are omitted, the wiring of such systems being well known. An indicator 29 included in the aforementioned surface equipment is arranged to move a pen 30 to provide an indication, preferably in the form of a graph or log, as illustrated at 33, of an electrical signal applied to its terminals in a manner hereinafter described. The graph is preferably formed by the indicator pen on a paper chart 31 which is drawn from a supply roll 32 by drum 28, the chart paper 31 thereby being moved relative to the pen in correlation with the depth within the borehole of the electrodes on support 17 as they are lowered or raised within the borehole. The indicator and its mechanical drive are, per se, conventional and well known in the art.

Referring now to the apparatus located at the earth's surface and diagrammatically indicated within the dashed line enclosure 22, there is provided a source of alternating current of frequency within a given frequency range and preferably, but not necessarily, of relatively constant frequency of the order of 400 cycles per second. This source of alternating current comprises an oscillator 35 having a tank circuit 34 connected in a conventional grid-tapped oscillator circuit with the triode section of an electron tube 36, which may, for example, be a type 608 tube, the oscillator output feeding through a coupling capacitor 37 to the input of an automatic output control circuit 38 which includes the pentode section of electron tube 36 as indicated. The output of control circuit 38 is in turn applied by way of capacitor 39 to an input adjusting potentiometer 40 from the adjustable terminal of which is taken an input excitation voltage for a power amplifier 41. Amplifier 41 is of conventional push-pull construction and comprises input transformer 42, the center tapped secondary of which is connected to the control grids of a pair of electron tubes 43 and 44 which may, for example, be of type 6146, and an output transformer 45, the center tapped primary of which is connected between the anodes of the electron tubes 43 and 44. The construction of the described source of alternating current is such that the current output from the secondary of transformer 45 may be manually preset to a desired value within suitable limits by adjustment of the amplifier excitation by input adjusting potentiometer 40, and can further be automatically regulated or controlled by a control bias potential applied to grid 46 of the right-hand section of electron tube 36. This control bias potential is supplied by rectification at rectifier circuit 48 of an alternating potential supplied thereto through lead 3a in a manner to be explained hereinafter.

The output of transformer 45 is employed to furnish all power required by the apparatus in the borehole, including the current to be passed from the current and auxiliary electrodes into the earth formations surrounding the borehole. One terminal of the secondary of transformer 45 is connected to lead 1a which is in turn connected to the cable sheath 1 through the slip ring and brush device 23. The other terminal of the secondary is connected to conductor 2 of the cable through a direct current blocking capacitor 50, lead 2a and device 23. Lead 1a of the surface apparatus and lead 1b of the apparatus within the borehole are both suitably grounded, and in the illustrated embodiment of apparatus are electrically connected to the cable sheath 1 which thus forms a common ground for both the surface apparatus and certain of the apparatus in the borehole. This ground connection will hereinafter be more fully described.

Alternating current thus supplied from the secondary of transformer 45 to cable conductor 2 passes from that conductor to and through lead 2b of the subsurface apparatus to an intermediate terminal 86; and thence through a second direct-current blocking capacitor 60 and the series connected primaries of transformers 61 and 62 respectively, and on through conductor 63 to a very low impedance strap 64 interconnecting auxiliary electrodes 18 and 19. Thus lead 2b, capacitor 60, the primaries of transformers 61 and 62 and lead 63 form an insulated connection means serving to electrically connect the lower end portion of cable conductor 2 to the electrode system for transfer of alternating current from cable conductor 2 to said electrode system. The current supplied to the electrodes flows into the surrounding earth formations and returns to transformer 45 by way of the earth, the ground connection which in this case is the sheath 1 of cable 16, device 23 and lead 1a. The apparatus arranged for positioning in the borehole and including current electrode 20 and the auxiliary electrodes 18 and 19, is designed to provide in the earth surrounding the borehole laterally adjacent the electrode 20 an alternating electric field of such shape that the current flowing from electrode 20 flows through the adjacent surrounding earth formations along flow lines or paths which are directed substantially laterally and radially outward with respect to the borehole axis for a considerable distance from the electrode, whereby a measure of that current furnishes an indication or measure of the resistance of path of that current through such earth formations. From a suitable representation or indication of the variations of the current flowing from the current electrode 20 and considering the effect of the resistance of the drilling fluid in the borehole and the shape of the electric field surrounding the electrode system, an accurate indication of the resistance characteristics of the earth strata or formation extending to a substantial distance laterally from the borehole may be obtained. The present invention, however, is directed primarily to a system for providing at the earth's surface an accurate representation of a measure of the current flowing from the current electrode, from which representation a suitable indication and/or record in the form of a graph may be obtained. It will be understood that preferably, but not necessarily, the current flowing from electrode 20 flows through the encircling layer or annulus of drilling fluid and through an approximately annular shaped portion of the encircling earth strata or formation laterally adjacent the electrode and through an additional great volume of the earth to the remote ground connection which, in the preferred embodiment of the invention is provided by the exposed portion of the submerged metallic sheath 1 of cable 16.

To secure an electric field of the stated nature and shape, that is, one in which current flows from electrode 20 out through the borehole fluid and surrounding formation along paths which are directed substantially radially outward perpendicular to the longitudinal axis of the borehole for a considerable distance, current is supplied from the aforesaid connection means comprising leads 2b and 63 and very low impedance strap 64 to the lower auxiliary electrodes 18 and 19 at the same potential with respect to the remote ground connection. Current is also supplied to the current electrode 20 through the aforesaid connection means through a very low impedance connection including in the preferred embodiment of the invention a primary winding 65 of a transformer 67 hereinafter more fully described, the arrangement being such that all three electrodes receive alternating current at substantially the same effective alternating potential. In order to maintain the instantaneous potential on the auxiliary electrodes and the current electrode substantially the same, strap 64 and primary winding 65 should be of such construction as to offer as low impedance to the respective currents flowing to the electrodes as is practicable. While the alternating current may in instances for convenience of illustration be herein described as flowing in one direction, it will of course be understood that it periodically reverses as is well known in the art. In the illustrated embodiment of the invention the current flowing from the current electrode 20 and through the surrounding earth formations preferably is restricted by the effect of the adjacent electric fields resulting from the flow of current into the earth from the adjacent auxiliary electrodes 18 and 19, to a disc-shaped zone of paths, which paths, at least near the borehole, extend substantially radially outward perpendicular to the borehole axis. After flowing a relatively large distance outwardly, the current from electrode 20 flows upwardly through a relatively great volume of earth to the sheath 1 of cable 16; and since the resistance to flow of that current decreases rapidly with increase of distance laterally from the electrode and borehole axis, and since the effective resistance of the remote ground connection is negligible, it is evident that a measure of that current is, for all practical purposes, an accurate indication of the resistance of an annulus of the borehole fluid and an annular shaped portion of the earth formation laterally adjacent and encircling the electrode 20 and of a depth equal to the length of that electrode. Since the resistivity of the drilling fluid remains relatively constant, as does the bore diameter of the borehole, variations in the resistance to flow of the current flowing from electrode 20 are, for all practical purposes, furnished only by variations in the resistance of the aforementioned annular-shaped portion of the earth formation laterally adjacent and encircling the electrode 20. Additional information concerning the theory of operation of a shaped-field electrode system such as is herein illustrated and which is, per se, not of the present invention, may be found in an article by Hubert Guyod and contained on pages 134, 136, 138, 140, 142 and 144 of the December 1951 issue of "World Oil," and in sources therein cited.

An accurate measure of the current flowing from electrode 20 into the earth formations is obtained by the production by that current of an alternating voltage proportional thereto in the secondary 66 of transformer 67. The voltage thus generated is utilized, without appreciable power drain from primary winding 65, as a signal which by its amplitude indicates the magnitude of the current flowing from electrode 20. To provide for the lowest practicable power loss in transformer 67, its primary 65 is constructed to present a very low impedance to the alternating current flow therethrough and its secondary 66 is constructed to have an extremely high impedance, and the core and winding arrangement and design is preferably such as to provide optimum pass characteristics and efficiency, at the particular frequency of the alternating current supplied by the current supply means. Transformer 67 may be so constructed, for example, as to have a primary impedance at 400 cycles per second of the order of $1/1000$ ohm and a secondary impedance at the same frequency of the order of 100,000 ohms, and constructed with a core and coil arrangement to give a sharply peaked efficiency characteristic at 400 cycles per second. The voltage generated in secondary 66 of transformer 67 is indicative of, and a measure of, the current flowing through the primary winding 65; and this voltage is applied to a linear amplifier 70 for amplification. The output of linear amplifier 70 provides a signal accurately indicative of the measure of the current flowing through primary winding 65. This signal is fed into a linear rectifier for rectification to produce a unidirectional signal in the form of a small unidirectional current suitable for transmission to the surface of the earth as hereinafter described.

The amplifier 70 may employ a dual purpose tube as illustrated at 71 which may be, for example, a type 6U8 pentode-triode amplifier tube. The output voltage from the secondary 66 of transformer 67 is applied through a condenser 72 to the control grid 71G of the pentode section of electron tube 71. The cathode of the pentode section of the tube is grounded to the common ground lead 1b, and the output from the anode 71A is applied through a blocking condenser 73 to the control grid 71TG of the triode section of tube 71. The cathode of the triode section of the tube is connected to the common ground lead 1b through a resistor $R_1$ which preferably in the embodiment of apparatus illustrated has a value of approximately 1,000 ohms. The condenser 73 preferably has a capacity of approximately .001 mfd. and the resistor $R_2$ connecting the control grid 71TG to the common ground lead 1b has a value of approximately one megohm. The output from the anode 71TA of the triode section of tube 71 is connected through the primary 74P of a transformer 74 to a conductor 75 connected to the positive terminal of a source of unidirectional high voltage hereinafter more fully described. High voltage is also supplied to the anode 71A and to the screen grid of the pentode section of the tube 71 through respective resistors $R_3$ and $R_4$ which may have values of approximately 510,000 ohms and 2.2 megohms, respectively.

The secondary winding 74S of transformer 74 is grounded at a center tap to the common ground lead 1b through a conductor 81, and the opposite ends of the secondary are connected to respective stationary contact points 77 and 78 of a synchronous rectifier device 76. The synchronous rectifier 76 is preferably mechanical to insure linear rectification and comprises a vibratory armature 79 which is driven synchronously with respect to the alternating current induced in the secondary 74S, by means of an electromagnet 80 which is energized by alternating current from the power supply as will be more fully described. The armature 79 is thus driven into alternate contact with the stationary contact points 77 and 78 in synchronism with the alternating current voltage appearing between those points. The resultant unidirectional signal is passed through the armature 79 and a low-pass filter 85 to the aforementioned junction terminal 86, and thence through the lead 2b to cable conductor 2 for transmission to the surface apparatus. Filter 85 is designed to pass frequencies from zero to approximately ten cycles per second and to have high attenuation for all higher frequencies, particularly for the frequency of the supplied alternating current.

A negative feedback connection is made from one half of the center tapped secondary winding 74S of transformer 74 through a conductor 82 and resistor $R_7$ to a point 83 between resistors $R_5$ and $R_6$ which are connected as voltage dividers between the control grid 71G and the common ground lead 1b. Suitable values for the resistors $R_7$, $R_5$ and $R_6$ have been found to be approximately 4,700 ohms, 510,000 ohms and 180 ohms, respectively, in the illustrated embodiment of apparatus. Considerable negative feedback is thus applied from secondary winding 74S of transformer 74 through conductor 82 to control grid 71G of the pentode section of electron tube 71. The first stage of the amplifier, comprising the pentode section of tube 71, is operated as a so-called "starvation" amplifier, which is accomplished by operating that portion of the tube at zero bias and at low plate and screen voltages and at about 10% below normal filament voltage. This results in a tendency for the gain of the pentode section of the tube to increase as the voltages of the tube electrodes including the cathode drop, and vice versa. The second stage of the amplifier, comprising the triode section of electron tube 71, is operated with cathode degeneration resulting from the presence of the before-mentioned resistor $R_1$ in the cathode lead, which tends to stabilize the gain of the second stage of the amplifier over wide ranges of filament and plate voltages. An important characteristic of the amplifier 70 which results from the before-mentioned arrangements is that it is capable of maintaining substantially constant gain over a very wide range of tube electrode voltage variations.

Since the signal representing the alternating current flowing from electrode 20 into the surrounding formation is now in the form of a unidirectional current signal having variations in value, the rate of change of which are determined by the rate of motion of the electrode system through the borehole past the penetrated formations, and therefore not ordinarily above ten cycles per second, it may be impressed upon lead 2b and cable conductor 2 for transmission to the surface of the earth, whereby that conductor is made to serve the dual purpose of conveying alternating current power from the power supply means at the surface to the electrode system within the borehole and of conveying the unidirectional current signal from the subsurface apparatus to the apparatus at the surface of the earth. Blocking capacitor 60 prevents transfer of the unidirectional signal to other than lead 2b, conductor 2 of the cable, and the apparatus at the surface of the earth. The ground return path, in this embodiment constituted by the grounded sheath 1 of cable 16, is employed with conductor 2 as indicated for completion of the circuit for the unidirectional signal. The unidirectional signal, substantially linearly representing the value of current flowing from electrode 20 into the adjacent earth formations, is thus transmitted to the surface of the earth where it is received on lead 2a and is prevented from being short-circuited through the output of the alternating current supply means to ground by blocking capacitor 50; and is impressed by way of conductor 94 upon a filter means comprising a low-pass filter 95 which serves to exclude currents and voltages of frequencies within the aforementioned frequency range of the power supply, but permits passage of the unidirectional signal variations of frequencies from zero to approximately ten cycles per second, to the input of a linearly operated amplifier 96. Amplifier 96 is of substantially conventional design, preferably comprising a type 5751 amplifier tube 97 and having an input impedance for the before-mentioned unidirectional signal which is high compared to the resistance and impedance changes which occur in the conductor 2 in the conductor cable 16 due to changes in temperature, pressure, stress and the like conditions attendant upon use of the cable partly in and partly out of the borehole. The input to amplifier 96 comprises a potentiometer having a resistor which may for example have a value of approximately 10,000 ohms connected between the output of the filter 95 and ground connection lead 1a, and an adjustable tap thereof connected to the control grid of tube 97. The amplified unidirectional signal output from amplifier 96 is applied by way of an adjustable potentiometer 100 and leads 98 and 99 to the indicator 29 for actuation of pen 30 for formation of a graph or log of the signal, as before-described. Potentiometer 100, while not necessary, is preferably provided for adjustment of the zero reading of the indicator.

Suitable power is supplied to the surface apparatus including amplifier 96, oscillator 35 and amplifier 41 from a conventional source of direct current (not shown) by way of connections including an anode supply lead 110, a screen-grid voltage supply lead 111 and a grid-bias voltage lead 112 in a manner and by means well known in the art.

Subsurface signal amplifier 70 is furnished power by a power distributing means fed from leads 1b and 2b and comprising a conventional power supply device including secondaries 120 and 121 of transformer 62, a rectifier circuit including rectifier tube 122 and smoothing filter 123, the D.-C. output of which is fed through conductor 75 to the screen grid and anodes of amplifier tube 71 in a manner hereinbefore indicated. Synchronous rectifier 76 is, as previously noted, driven by an electromagnet 80 energized by 400 cycle per second alternating current power furnished by the aforementioned transformer 61 whose primary is in series in lead 2b. In order to operate armature 79 so as to secure linear rectification, electromagnet 80 is energized from the secondary of transformer 61 by way of a phase shifting network including a capacitor 130 and an adjustable resistor 131 connected as indicated, whereby, by suitable adjustment of the effective portion of resistor 131 the phase of the alternating current in electromagnet 80 with respect to that appearing between rectifier contact points 77 and 78 may be so adjusted that armature 79 moves from contact 77 to contact 78 and vice versa during the brief interval when the alternating current signal wave in transformer secondary 74S passes through zero value.

To insure that a substantially uniform alternating potential will prevail on the electrode system including electrodes 18, 19 and 20 (with respect to the aforementioned remote ground connection), irrespective of variations in earth formation resistance, drilling fluid resistance and cable conductor resistance, the alternating potential existing on those electrodes is applied through subsurface connection 3b, insulated cable conductor 3 and surface lead 3a to the aforementioned rectifier circuit 48, whose direct current output is, as previously noted, applied to grid 46 of the pentode or amplitude-control section of electron tube 36. There the thus rectified potential is effective to increase or decrease the output of the surface current supply means 41 as a decrease or increase in effective resistance, respectively, is presented to flow of current from the electrodes through the adjacent formations to the remote ground connection. Rectifier circuit 48 includes a rectifier 53, which may be of the crystal diode type, connected as indicated. Thus, a substantially uniform potential of the electrodes 18, 19 and 20 with respect to the aforementioned remote ground connection is maintained irrespective of variations in the resistances of earth formations and of other circuit elements by automatic variation of the current supplied to the electrodes. Such corrective variation of the current flowing to the electrodes through the circuit which includes the transformer 62 results in a corresponding variation in the voltages and currents supplied to the amplifier 70. This variation in voltage and current supplied to amplifier 70 would ordinarily result in undesirable variations in gain and variations of other characteristics of the amplifier which would in turn result in large errors in magnitude of the resultant unidirectional current signal returned therefrom through cable conductor 2 to the amplifier and indicating system at the surface. However, due to the high degree of stability and uniformity of gain of the amplifier 70 as hereinbefore described, such variations in electrode current can be tolerated with substantially no resultant error in the unidirectional signal.

From the description thus far set out, it will be noted that while any suitable ground connection may be made to the earth for using the earth as a return conductor for completing the circuit between leads 1a and 1b instead of sheath 1, the upper, uninsulated portion of sheath 1 of cable 16 serves the purpose of a common ground in an advantageous manner, providing a very low impedance ground connection. In either case, the length of the insulation covering the container 17 may be extended to cover and insulate any desired length of the cable sheath, and should extend for sufficient distance above electrode 18 to insure that the portion of the cable sheath exposed thereabove will act as a remote ground to which currents from electrodes 18, 19 and 20 flow. This distance should be great enough to permit the current from electrodes 18, 19 and 20 to flow outward from the electrodes substantially perpendicularly to the axis of the borehole for a suitable distance into the surrounding formations as is required in the so-called "guarded-electrode" system. This distance separating the top of the electrode 18 and the next adjacent exposed portion of the grounded sheath or other equivalent remote ground should not be less than approximately 50 feet, and may be any desired greater distance up to a total depth of the electrodes within the borehole when the remote ground connection is located at the earth's surface.

Under some circumstances conventional resistance logging measurements may be made without employing the auxiliary electrodes 18 and 19 and with or without employing the automatic potential regulating features embodied in the circuitry comprising lead 3b, conductor 3, lead 3a and rectifier circuit 48. The apparatus then consists essentially of the power supply means, lead 2a, conductor 2, the connection means connecting conductor 2 with electrode 20, that electrode, the ground connection remote from electrode 20 and the unidirectional current signal producing and receiving means, this combination forming an operable system capable of giving superiorly accurate results due to measurement of the desired characteristic closely adjacent the electrode. The reasons for using a 400 cycle per second current supply frequency and a unidirectional-current return signal in the preferred embodiment of the invention reside in considerations of practicality and of ease in separating the signal from the alternating current, and vice versa, while making efficient use of a single cable conductor for their transmission. Also all signal "cross-talk" and like undesirable effects are virtually eliminated. While the signal output of amplifier 96 is an electric signal that is applied to a signal responsive means in the form of an indicator 29 adapted to form a graphical log, other types of signal responsive means may be employed.

Not by itself forming a part of the present invention, but diagrammatically illustrated on the drawing for the purposes of clearly indicating the characteristics and advantages of the invention with respect to employment of a three-conductor cable, is a natural potential measuring and logging system comprising conventional apparatus 150 having terminals A″, B″ and C″ adapted to be connected to terminals A, B and C of selsyn generator 25 for depth correlation of the measurements of natural potential in conventional manner, and potential terminals connected as indicated to ground lead 1a and potential lead 4a, which latter in turn is connected electrically by way of brush and slip ring device 23 to insulated conductor 4 of cable 16. Conductor 4 is connected, in turn, to a natural potential pickup electrode 151 which may be a metallic sleeve mounted on insulating support or container 17 adjacent its upper end, or in any other suitable position. Similarly and alternatively, other signals indicative of other quantities than natural potential may be transmitted through conductor 4 and lead 4a, or others of the conductors, simultaneously with the other operations herein described.

The terms "measuring" or "a measure of" as applied to the resistance, resistivity, voltage, potential, current or the like and other quantities specified herein are not to be limited in meaning to actual quantitative determination of numerical values in terms of ohms, amperes, volts or the like; but are intended to include the production of any signal, electrical or visual, or the actuation of any means or device such as ammeter or voltmeter or the like device, whereby an electric signal or a visual indication or a graphical record of a measure of such indication of such values or suitable functions thereof, or changes therein, may be obtained.

From the above description of a preferred embodiment of apparatus according to the invention it will be noted that by taking a measure of the current flowing from the current electrode into the adjacent formations at a point closely adjacent the electrode rather than at a point exteriorly of the borehole as in the prior art, a very accurate indication of that current may be obtained. Further, it will be noted that the measure thus taken of the electrode current may be and is, converted into suitable signals which are efficiently and linearly transmitted to a point outside the borehole and there utilized to provide an indication of the current flowing from the electrode. Thus the inaccuracies of the prior art systems are obviated. Further, it will be noted that by the employment of a single insulated conductor for the simultaneous transmission of alternating current power from the surface apparatus to the subsurface apparatus and the transmission of a unidirectional signal from the subsurface apparatus to the surface apparatus, very efficient use of available cable conductors is effected or obtained, and use of a three-conductor cable is permitted for simultaneous natural potential and very accurate resistance logging.

It is understood that modifications and variations from the specific structure and circuitry of the preferred embodiment will be evident to those skilled in the art and such modifications and variations are included in the concept of the invention. Accordingly, it is to be understood that the invention is not to be limited to the exact details of the disclosed embodiment of the invention, but includes all modifications thereof within the scope of the invention as defined in the appended claims.

What is claimed is:

1. In a system for obtaining at the surface of the earth an accurate indication of a measure of an electrical characteristic of earth formations penetrated by an earth borehole, apparatus comprising: means including at least one insulated electrical conductor, adapted to be lowered into such borehole; a plurality of separate electrodes supported by and adjacent the lower end of said means and adapted for passing electric current into earth formations there-adjacent; a ground connection remote from said electrodes and forming an electrical connection with the earth; a source of alternating current outside said borehole and connection means including said conductor, connecting said source between said electrodes and said ground connection whereby alternating current may be caused to flow from said electrodes into said earth formations and to said ground connection; means carried by said first-mentioned means and located adjacent one of said electrodes for producing a unidirectional electric signal substantially proportional to the flow of alternating current from said one electrode into the earth formations, and for applying said unidirectional electric signal to a lower end portion of said conductor; and electrical means connected to an upper end portion of said conductor and effective to admit said unidirectional electric signal and to reject alternating currents of the frequency of the alternating current produced by said source, and said electrical means further being effective to produce from the admitted unidirectional electrical signal an indication of that signal.

2. In a system for electrical logging of an earth borehole, apparatus comprising: means including an insulated electrical conductor; a plurality of separate electrodes supported by and adjacent the lower end of said means and adapted to be lowered thereby into such borehole; a ground connection remote from said electrodes; insulated connection means electrically connecting a lower end portion of said conductor to said electrodes; a source of alternating current of frequency within a certain frequency range connected between the upper end of said conductor and said ground connection, whereby alternating current of said frequency may be caused to flow through said conductor and said connection means and from said electrodes into adjacent earth formations; means adjacent said electrode for producing a unidirectional electric signal subject to variation at frequencies below said frequency range and substantially proportional to the alternating current flow from one only of said electrodes into said adjacent formations; means for applying said electric signal to a lower end portion of said conductor; and electrical means connected to the upper end of said conductor and substantially unresponsive to alternating voltages and currents within said frequency range, but responsive to said electric signal for producing an indication of said signal.

3. In a system for electrical logging of an earth borehole, apparatus comprising: a cable comprising at least one insulated electrical conductor; an electrode supported by and adjacent the lower end of said cable and adapted to be lowered thereby into such borehole; a ground connection remote from said electrode; insulated connection means electrically connecting the lower end portion of said conductor of said cable to said electrode; a source of alternating current of frequency within a certain frequency range connected between the upper end of said conductor and said ground connection whereby alternating current of said frequency may be caused to flow from said electrode into adjacent formations and through the earth to said remote ground connection; means adjacent said electrode for producing a unidirectional electric signal subject to variations at frequencies below said frequency range and substantially proportional to said alternating current flow from said electrode into said adjacent formations; means for applying said electric signal to a lower end portion of said conductor; and electrical indicating means having an input connected to the upper end portion of said conductor, said electrical indicating means being substantially unresponsive to the alternating voltage in said conductor resulting from said alternating current, but responsive to said electric signal, and said input having a unidirectional current input impedance which is high relative to changes in resistance of said conductor caused by varying conditions to which said cable is subject during logging.

4. In a system for electrical logging of an earth borehole, apparatus comprising: a cable comprising at least one insulated electrical conductor; a plurality of electrodes including a current electrode, supported by and adjacent the lower end of said cable and adapted to be lowered thereby into and make electrical contact with conductive fluid in such borehole; a ground connection remote from said electrodes; connection means insulated from contact with such fluid and electrically connecting the lower end of said conductor of said cable with said electrodes; a source of alternating current of frequency within a certain frequency range connected between the upper end portion of said conductor and said ground connection whereby alternating current of said frequency may be caused to flow from said electrodes into adjacent earth formations and to said ground connection; means closely adjacent said current electrode for producing a unidirectional current signal subject to variation at frequencies which are below said certain frequency range and substantially proportional to the alternating current flow from said current electrode into said adjacent formations; means for applying said unidirectional current signal to a lower end portion of said conductor of said cable; electrical means having an input and an output, the input thereof electrically connected with the upper end of said conductor of said cable and being substantially unresponsive to the alternating voltages thereof within said frequency range but responsive to said unidirectional current signal for producing an electrical output substantially proportional to said unidirectional current signal; and indicator means connected to the output of said electrical means and responsive to said electrical output thereby to produce an indication of the value of the aforesaid alternating current flowing from said current electrode into the adjacent formations.

5. Apparatus according to claim 1 in which said electrical means includes an amplifier, an amplifier input means electrically interconnecting the upper end of said last-mentioned conductor and said amplifier, said amplifier input means being rejective of alternating current voltage of said last-mentioned conductor of the frequency of said alternating current, but receptive of said unidirectional electric signal from said last-mentioned conductor to apply such signal to the input of said amplifier, for producing an electrical output substantially proportional to said electric signal.

6. Apparatus according to claim 5 in which said amplifier input means includes a low-pass filter means having relatively low attenuation for frequencies from zero to approximately ten cycles per second and relatively high attenuation for frequencies above approximately ten cycles per second.

7. Apparatus according to claim 6 in which said amplifier input means has a unidirectional current input impedance which is high relative to changes in resistance of said last-mentioned conductor due to varying conditions to which said conductor is subject during use in said borehole.

8. In a system for electrical logging of an earth borehole, apparatus comprising: a cable comprising at least one insulated conductor; a plurality of electrodes including a current electrode, supported by and adjacent the lower end of said cable and adapted to be lowered thereby into and make electrical contact with conductive fluid in such borehole; a ground conection remote from said electrode; connection means insulated from contact with such fluid and electrically connecting said conductor at its lower end to said electrodes; a source of alternating current connected between the upper end of said conductor and said ground connection whereby alternating current may be caused to flow through said conductor, said connection means and from said electrodes into adjacent earth formations and to said ground connection; means at the lower end of said cable for producing a unidirectional signal substantially proportional in magnitude to the alternating current flow from said current electrode only into adjacent earth formations; means for applying said unidirectional signal to the lower end portion of said conductor; electrical means comprising a substantially linear amplifier, electrically connected to the upper end of said conductor and substantially unresponsive to the alternating voltage of said conductor of the frequency of said alternating current but responsive to said applied unidirectional signal for producing an electrical output substantially proportional to said unidirectional signal; and indicator means connected to receive said electrical output of said electrical means and responsive to said electrical output to produce an indication of the value of the aforesaid alternating current flowing from said electrode into adjacent earth formations.

9. In a system for electrical logging of a conductive fluid filled earth borehole, apparatus comprising: means including a cable comprising first and second conductors insulated from one another; a plurality of electrodes including a current electrode, supported by said means adjacent the lower end of said cable and adapted to be lowered thereby into and to make electrical contact with the conductive fluid in such borehole; a ground connection remote from said electrodes; connection means insulated from contact with such fluid and electrically connecting the lower end portion of said first conductor of said cable to said electrodes; a source of alternating current connected between the upper end of said first conductor and said ground connection whereby alternating current may be caused to flow through said first conductor, said connection means and from said electrodes into the adjacent earth formations surrounding the borehole; an electrical connection between said electrodes and a lower end portion of said second conductor of said cable whereby the potential of said electrodes relative to said ground connection is applied to said second conductor; means electrically connected to the upper end of said second conductor and responsive to said potential for regulating the alternating current output of said source of alternating current in a manner tending to maintain said potential constant; means adjacent said current electrode for producing a unidirectional current having a value substantially proportional to the alternating current flow from said current electrode only into the adjacent earth formations; means for applying said unidirectional current to a lower end portion of said first conductor; means including an amplifier having an input and an output, electrically connected with the upper end of said first conductor and substantially unresponsive to the alternating voltage thereof resulting from said alternating current but responsive to said unidirectional current applied thereto, for producing an electrical output substantially proportional to said unidirectional current; and indicator means connected to receive the output of said amplifier and responsive to said electrical output to produce an indication of the value of the aforesaid alternating current flowing from said current electrode only into the adjacent earth formations.

10. Apparatus according to claim 1 in which said connection means includes a primary winding of a transformer connected to convey current to only said one electrode; and in which said means for producing a unidirectional electric signal proportional to the alternating current flow from said one electrode only comprises: a secondary winding of said transformer; amplifier means having an input and an output and having its input connected to said secondary winding, for producing an amplified alternating current output substantially linearly proportional to the alternating current in said primary winding; and means including a synchronous mechanical rectifier connected to the output of said amplifier means for rectifying said alternating current output for producing a unidirectional signal therefrom substantially proportional in magnitude to said alternating current output of said amplifier.

11. Apparatus according to claim 1 in which said connection means includes a relatively low impedance primary of a transformer through which primary the alternating current flowing from said one electrode only passes; and in which said means for producing a unidirectional electric signal proportional to the said alternating current flow from said one electrode only comprises: a relatively high impedance secondary of said transformer; amplifier means having an input and an output, the input of said amplifier being connected to said secondary for producing an amplified alternating current output substantially proportional to the alternating current in said primary, and a synchronous mechanical rectifier connected to the output of said amplifier for rectifying said alternating current output for producing a unidirectional signal therefrom substantially proportional to the alternating current output of said amplifier.

12. In a system for electrical logging of a conductive fluid filled earth borehole, apparatus comprising: means including a cable having a plurality of conductors insulated from each other; a plurality of electrodes supported by and located adjacent the lower end of said means and adapted to be lowered thereby into and to make electrical contact with the conductive fluid in such borehole, said electrodes including a pair of elongated, coaxially positioned longitudinally spaced-apart auxiliary electrodes and a current electrode relatively short as compared to said auxiliary electrodes and positioned intermediate and spaced apart longitudinally from the adjacent ends of said auxiliary electrodes; insulation means electrically insulating said electrodes from each other and from conductive external portions of said cable; a ground connection remote from said electrodes; electrical connection means connecting the lower end portion of a first conductor of said cable to said current electrode and said auxiliary electrodes; a source of alternating current connected between the upper end of said first conductor and said ground connection whereby alternating current may be caused to flow through said first conductor, said connection means and from said current electrode and auxiliary electrodes into adjacent earth formations surrounding said electrodes and thence to said ground connection; an electrical connection between said auxiliary electrodes and the lower end portion of a second conductor of said cable whereby the potential of said auxiliary electrodes with respect to said ground connection is applied to said second conductor; means electrically connected to the upper end portion of said second conductor and responsive to the potential thereof for regulating the alternating current output of said source in a manner tending to maintain said potential of said auxiliary electrodes relative to said ground connection constant; means in said first-mentioned means adjacent said current electrode, responsive to alternating current flow from said current electrode, for producing a unidirectional signal having a value substantially proportional to the alternating current flow from said current electrode; means for applying said unidirectional signal to a lower end portion of said first conductor; means including amplifier means having an input and an output, connected to the upper end portion of said first conductor and substantially unresponsive to the alternating voltage thereof resulting from said alternating current but responsive to said unidirectional signal for producing an electrical output substantially proportional to said unidirectional signal; and indicator means connected to the output of said amplifier means and responsive to said electrical output to produce an indication of the value of the aforesaid alternating current flowing from said current electrode.

13. In a system for obtaining at the surface of the earth an accurate indication of a measure of an electrical characteristic of earth formations penetrated by an earth borehole, apparatus comprising: means including at least one insulated electrical conductor, adapted to be lowered into such borehole; an electrode supported by and adjacent the lower end of said means and adapted for passing electric current into earth formations thereadjacent; a ground connection remote from said electrode and forming an electrical connection with the earth; a source of alternating current outside said borehole and means including said conductor connecting the source between said electrode and said ground connection whereby alternating current may be caused to flow from said electrode into said earth formations and to said ground connection; means carried by said first-mentioned means and located adjacent said electrode for producing a unidirectional electric signal substantially proportional to the flow of alternating current from said electrode into the earth formations, and for applying said unidirectional electric signal to a lower end portion of an insulated conductor of said first-mentioned means; and electrical means having an input means, connected to an upper portion of said last-mentioned insulated conductor and effective to admit said unidirectional electric signal and to reject alternating currents of the frequency of the alternating current produced by said source of alternating current, said electrical means further being effective to produce from the admitted unidirectional electrical signal an indication of that signal, and said input means having a unidirectional current input impedance which is high relative to changes in resistance of said last-mentioned conductor due to varying conditions to which said first-mentioned means is subject during logging.

14. In a system for electrical logging of a conductive fluid-filled earth borehole, apparatus comprising: means including a cable having an insulated conductor extending therethrough; a plurality of electrodes supported by and located adjacent the lower end of said means and adapted to be lowered thereby into and to make electrical contact with the conductive fluid in such borehole, said electrodes including a pair of elongated, coaxially positioned, longitudinally spaced apart auxiliary electrodes and a current electrode relatively short as compared with said auxiliary electrodes and positioned intermediate and spaced apart longitudinally from the adjacent ends of said auxiliary electrodes; insulation means electrically insulating said electrodes from each other and from conductive external portions of said cable; a ground connection remote from said electrodes; electrical connection means connecting the lower end portion of said conductor of said cable to said current electrode and said auxiliary electrodes; a source of alternating current connected between the upper end of said conductor and said ground connection whereby alternating current may be caused to flow through said conductor, said connection means and from said current electrode and auxiliary electrodes into adjacent earth formations surrounding said electrodes and thence to said ground connection; means in said first-mentioned means adjacent said current electrode, responsive to alternating current flow from said current electrode, for producing a unidirectional signal having a value substantially proportional to the alternating current flow from said current electrode; means for applying said unidirectional signal to a lower end portion of said conductor; means including amplifier means having an input and an output, connected through said input to the upper end portion of said first conductor and substantially unresponsive to the alternating voltage thereof resulting from said alternating current but responsive to said unidirectional signal for producing an electrical output substantially proportional to said unidirectional signal; and indicator means connected to the output of said amplifier means and responsive to said electrical output to produce an indication of the value of the aforesaid alternating current flowing from said current electrode.

15. In a system for electrical logging of a conductive fluid-filled earth borehole, apparatus comprising: means including a cable having an insulated conductor extending therethrough; a plurality of electrodes supported by and located adjacent the lower end of said means and adapted to be lowered thereby into and to make electrical contact with the conductive fluid in such borehole, said electrodes including a pair of elongated, coaxially positioned, longitudinally spaced apart auxiliary electrodes and a current electrode relatively short as compared with said auxiliary electrodes and positioned intermediate and spaced apart longitudinally from the adjacent ends of said auxiliary electrodes; insulation means electrically insulating said electrodes from each other and from conductive external portions of said cable; a ground connection remote from said electrodes; electrical connection means connecting the lower end portion of said conductor of said cable to said current electrode and said auxiliary electrodes; a source of alternating current connected between the upper end of said conductor and said ground connection whereby alternating current may be caused to flow through said conductor, said connection means and from said current electrode and auxiliary electrodes into adjacent earth formations surrounding said electrodes and thence to said ground connection; means in said first-mentioned means adjacent said current electrode, responsive to alternating current flow from said current electrode, for producing a unidirectional signal having a value substantially proportional to the alternating current flow from said current electrode; means for applying said unidirectional signal to a lower end portion of said conductor; means having an input and an output, connected through said input to the upper end portion of said first conductor and substantially unresponsive to the alternating voltage thereof resulting from said alternating current but responsive to said unidirectional signal for producing an electrical output substantially proportional to said unidirectional signal; and indicator means connected to the said output and responsive to said electrical output to produce an indication of the value of the aforesaid alternating current flowing from said current electrode.

References Cited in the file of this patent
UNITED STATES PATENTS

| | | |
|---|---|---|
| 2,132,807 | Rust et al. | Oct. 11, 1938 |
| 2,347,794 | Piety | May 2, 1944 |
| 2,357,177 | Doll | Aug. 29, 1944 |
| 2,376,168 | Mounce | May 15, 1945 |
| 2,501,953 | Martin | Mar. 28, 1950 |
| 2,592,101 | Aiken | Apr. 8, 1952 |
| 2,596,125 | Doll | Apr. 8, 1952 |